(12) United States Patent
Bridger et al.

(10) Patent No.: US 7,697,263 B2
(45) Date of Patent: Apr. 13, 2010

(54) HIGH-TEMPERATURE DIELECTRIC MATERIALS AND CAPACITORS MADE THEREFROM

(75) Inventors: Keith Bridger, Washington, DC (US);
Arthur V. Cooke, Baltimore, MD (US);
Walter Arthur Schulze, Alfred Station, NY (US)

(73) Assignees: Active Signal Technologies, Inc., Linthicum, MD (US); Alfred University, Alfred, NY (US)

( * ) Notice: Subject to any disclaimer, the term of this patent is extended or adjusted under 35 U.S.C. 154(b) by 204 days.

(21) Appl. No.: 11/691,837

(22) Filed: Mar. 27, 2007

(65) Prior Publication Data
US 2008/0239627 A1 Oct. 2, 2008

(51) Int. Cl.
*H01G 4/06* (2006.01)

(52) U.S. Cl. .......... 361/311; 361/313; 361/321.1; 361/312; 361/321.2; 361/306.1

(58) Field of Classification Search .......... 361/321.4, 361/321.5, 311–313, 321.1, 303–305, 321.2; 501/136–139
See application file for complete search history.

(56) References Cited

U.S. PATENT DOCUMENTS

| | | | |
|---|---|---|---|
| 4,119,554 A * | 10/1978 | Fujiwara | 501/135 |
| 4,624,129 A | 11/1986 | Haynes | |
| 5,006,956 A * | 4/1991 | Kawakita et al. | 361/321.5 |
| 5,059,566 A * | 10/1991 | Kanai et al. | 501/138 |
| 5,637,542 A | 6/1997 | Takenaka | |
| 5,680,291 A * | 10/1997 | Kim et al. | 361/321.4 |
| 6,231,779 B1 * | 5/2001 | Chiang et al. | 252/62.9 R |
| 6,300,267 B1 * | 10/2001 | Chen et al. | 501/135 |
| 6,426,018 B1 * | 7/2002 | Takahashi et al. | 252/62.9 R |
| 6,565,997 B2 | 5/2003 | Kashiwaya | |
| 6,610,427 B2 | 8/2003 | Kashiwaya et al. | |
| 6,731,049 B2 | 5/2004 | Kashiwaya et al. | |
| 6,793,843 B2 | 9/2004 | Furukawa et al. | |
| 7,009,328 B2 | 3/2006 | Kitagawa et al. | |
| 7,090,785 B2 * | 8/2006 | Chiang et al. | 252/62.9 R |

OTHER PUBLICATIONS

Smolenskii et al., "New Ferroelectrics of Complex Composition. IV", Soviet Physics—Solid State, vol. 2, No. 11, pp. 2651-2654, May 1961.
Kuharuangrong et al., "Modified Bi0.5Na0.5TiO3 High Temperature Dielectrics", IEEE UFFC, the 6th US-Japan Seminar on Dielectric and Piezoelectric Ceramics etc., 1993.

(Continued)

*Primary Examiner*—Nguyen T Ha
(74) *Attorney, Agent, or Firm*—Alan G. Towner, Esq.; Pietragallo Gordon Alfano Bosick & Raspanti, LLP (57) ABSTRACT

A ceramic dielectric composition suitable for preparing capacitors for use in high-temperature service conditions is disclosed. The ceramic material and capacitors made from it exhibit unique and heretofore unrealizable properties including low variation in capacitance with voltage up to high fields, low variation in capacitance with temperature over a broad temperature range, retained high permittivity at temperatures up to 200° C. and beyond, low loss, low field-induced strain and adequate capacitance to retain performance at very low service temperatures. The material is based on sodium bismuth titanate (NBT) with selected additions of substituents and dopants to broaden and flatten its dielectric response, lower loss, lower strain, lower voltage coefficient and increase resistivity.

64 Claims, 6 Drawing Sheets

OTHER PUBLICATIONS

Kuharuangrong, "Studies on the Dielectric Properties and the Phase Transitions of the Bi0.5Na0.5TiO3-PbTiO3 System", thesis submitted to Alfred Univ., Alfred, NY, Dec. 1994.

Walsh et al., "Bond Valence Structure Analysis of Doped Bismuth Sodium Titanate", 14th IEEE Int'l Symposium on Applications of Ferroelectrics, pp. 328-331, 2004.

Walsh et al., "Bond Valence Approach to the Study of Dopant Effects on the Bismuth Sodium Titanate System of High Temperature Dielectric Materials", presented at the IMAPS International High Temperature Electronics Conference (HiTEC 2004) in Santa Fe, NM, May 20, 2004.

Yan et al., "The dependence of the piezoelectric properties on the differences of the A-site and B-site ions for (Bi1-xNax)TiO3-based ceramics", Mat and Des 26 (2005) 474-478.

Wang et al., "TiO2-nonstoichiometry dependence on piezoelectric properties and depolarization temperature of (Bi0.5Na0.5)0.94Ba0.06TiO3 lead-free ceramics", Solid State Communications 134 (2005) 659-663.

Li et al., "Piezoelectric and ferroelectric properties of Na0.5Bi0.5TiO3-K0.5Bi0.5TiO3-BaTiO3 piezoelectric ceramics", Materials Letters 59 (2005) 1361-1364.

Peng et al., "Preparation and properties of (Bi1/2Na1/2)TiO3-Ba(Ti,Zr)O3 lead-free piezoelectric ceramics", Materials Letters 59 (2005) 1576-1580.

Zhou et al., "Piezoelectric properties of Mn-doped (Na0.5Bi0.5)0.92Ba0.08TiO3 ceramics", Materials Letters 59 (2005) 1649-1652.

Alberta et al., "Ceramic Capacitors for Extreme Environments", pp. 142-147, Carts USA 2005, Mar. 21-24, 2005, Palms Springs, CA.

* cited by examiner

HIGH-TEMPERATURE DIELECTRIC MATERIALS AND CAPACITORS MADE THEREFROM

GOVERNMENT CONTRACT

The United States Government has certain rights to this invention pursuant to Contract No. DTRA01-03-C-0031 awarded by the Defense Threat Reduction Agency.

FIELD OF THE INVENTION

The present invention relates to high-temperature dielectric compositions and capacitors fabricated from these dielectrics, and more particularly, relates to a family of dielectric compositions based on sodium bismuth titanate.

BACKGROUND INFORMATION

Many power electronic systems are currently limited by the low dielectric constant and/or low upper limit of operating temperature of commercially available capacitors and dielectric materials. Today's capacitors are typically limited in temperature capability to a maximum of 125° C., whereas many current commercial and military application temperatures range from –55 to 200° C. and even to 300° C. in some instances. Moreover, the application temperature refers to ambient service conditions and does not take into account internal heating of the part and surrounding components on the same circuit board. Accordingly, actual part temperature can readily exceed the environmental specification.

Today's capacitors that meet the higher and wider temperature range have to be fabricated from very low permittivity dielectrics and thus have relatively large dimensions. Specific uses include DC and AC power filtering, energy storage, high repetition rate (pulse power) devices, high energy back-up or hold-up power devices and small signal capacitor applications for controls. Although some of these applications may be accommodated with engineering "work-arounds" and performance trade-offs, future systems—particularly oil well logging instrumentation, avionic controls, advanced weapon electronics, power-conditioning electronics and under-the-hood automotive components—will require better material properties to meet more demanding performance goals.

An increasing problem in certain systems today is exceeding the service temperature of electronic components because of the heat generated in current highly miniaturized and densely packed electronic circuits. For example, temperature limitations of capacitors have been identified as the weak link in power electronic system reliability as manifest in motor drives, inverters/converters for switched reluctance starter/generator systems, DC to AC converters, DC to DC converters, and pulse forming networks.

Instead of utilizing remote processing and control, many industrial and commercial applications are now being designed to take advantage of the weight, power and space savings that can be achieved with local dedicated electronic boxes. For example in transport applications, such as automobile motors and aircraft engines, sensing and control instrumentation is being placed closer to the power plant itself where the service temperature limits exceed those of available electronic components. Similarly, the large oil and gas exploration companies are placing bore-hole instrumentation directly adjacent to the hot zone at the drilling face.

While barium titanate has been used in high performance capacitor applications and has a wide operating temperature, ultimate performance is limited by its inherently low transition temperatures (–90, 0, 130° C.) and its semiconducting properties at elevated temperature.

Many other high temperature electroceramic materials are known which have isolated high dielectric performance over a limited temperature range but very low dielectric constant at temperatures on either side of this band. An example is lead titanate which is an excellent dielectric in the very close vicinity of its 490° C. phase transition temperature. Attempts have been made to broaden the dielectric response, even though this lowers the temperature at which the dielectric constant peaks, by modification with calcium, but its dielectric properties then drop into the low hundreds.

Alternatively many electroceramic materials are known to have constant but low permittivities over a wide range of temperatures. Thus dielectrics based on medium-K titanates such as strontium titanate ($SrTiO_3$ or ST), calcium titanate ($CaTiO_3$ or CT), magnesium titanate ($MgTiO_3$ or MT), glass-ceramics and porcelains have been formulated to have near zero variation in permittivity with temperature and low loss over a wide temperature range. These dielectrics typically have dielectric constants<200 and so capacitors made from them are relatively large.

A need exists for a moderately-high permittivity dielectric that has low variation in dielectric constant with temperature, low loss and high resistivity over a broad temperature range.

SUMMARY OF THE INVENTION

The present invention is directed to a family of dielectrics based on sodium bismuth titanate, $Na_{0.5}Bi_{0.5}TiO_3$ (NBT), and capacitors fabricated from these dielectrics. The dielectrics have moderately high permittivity, a broad range of temperature over which the permittivity is constant, and low loss and high resistivity over that temperature range. In addition the dielectrics should have little or no variation in permittivity with electric field and should exhibit low induced strain with applied electric field.

The present dielectrics may have moderate permittivity (>1000), low loss (<2%), high resistivity (>$10^{10}$ ohm-m), and low variation in permittivity (±15%) over the temperature range –30 to 200° C. and/or over a relatively broad range of elevated temperatures, e.g., 200±100° C. to 400±100° C. Capacitors fabricated from these dielectrics may also have low loss (<2%), high insulation resistance, and low variation in capacitance (±15%) over the temperature range –30 to 200° C. and/or over a relatively broad range of elevated temperatures, e.g., from 150±100° C. to 350±100° C. Furthermore, capacitors fabricated from these dielectrics may have low field induced strain (<100 microstrains at 10 MV/m) and low variation in capacitance (±15%) with applied voltage up to field strengths of 10-15 MV/m.

An aspect of the present invention is to provide a dielectric material for use in a capacitor comprising sodium bismuth titanate in which titanium is partially substituted by monavalent ions and 5-valent ions. The dielectric material may be of the formula:

where $Me^1$ is at least one monovalent metal ion comprising Li, Na, K, Rb, Ag and/or Cu, $Me^2$ is at least one divalent metal ion comprising Ba, Ca, Mg, Pb, and/or Sr, $Me^3$ is at least one trivalent metal ion comprising La, Ce, Pr, Nd, Pm, Sm, Eu, Gd, Th, Dy, Ho, Er, Tm, Yb, Lu and/or Y, $Me^4$ is at least one tetravalent metal ion comprising Hf, Zr and/or Sn, $Me^5$ is a 5-valent ion comprising Nb, Ta, P and/or Sb, and $Me^6$ is at least one 6-valent ion comprising W, and wherein $x \leq 0.3$, $s \leq 0.6$, $t \leq 0.12$, $z \leq 0.25$, $w \leq 0.3$ and $y \leq 0.01$.

Another aspect of the present invention is to provide capacitors including the above-noted dielectric formulation.

These and other aspects of the present invention will be more apparent from the following description.

DETAILED DESCRIPTION

The present invention is directed to a family of dielectrics based on sodium bismuth titanate (NBT) and capacitors fabricated from these dielectrics designed to operate over a broad range of temperatures extending up to elevated temperatures heretofore unobtainable with useful permittivity. To meet the real world constraints and needs of electronic circuit designers, a high temperature capacitor material should embody more than just high permittivity and very low electrostrictive strain at high temperature. Some of the additional performance characteristics of primary importance include adequate permittivity at ambient temperature and at very low temperature (standard specifications typically call for operation at −55° C.), low loss, low variation of capacitance (flatness) with temperature and applied voltage, very little capacitance drop between room temperature and elevated temperature (200° C. and above), high insulation resistance and service reliability (long term survival at elevated temperatures under bias voltage). The present invention provides compositions, synthesis and processing conditions needed to reach these goals.

Figure 1:
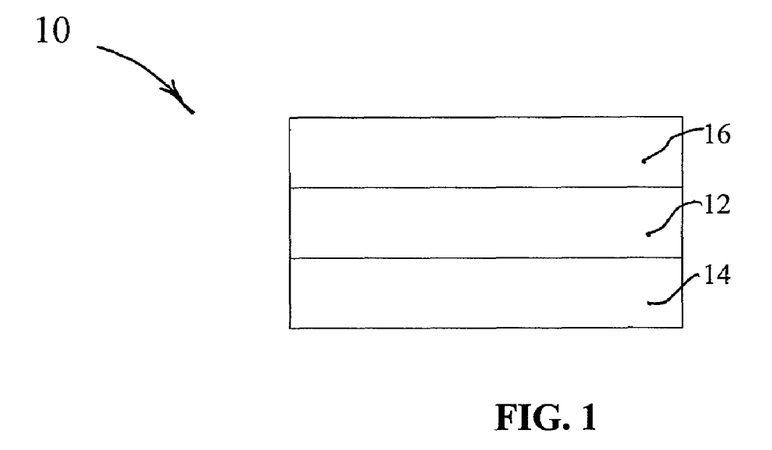
FIG. 1 is a partially schematic illustration of a monolithic capacitor which may include a dielectric material in accordance with an embodiment of the present invention.

FIG. 1 schematically illustrates a monolithic capacitor including a layer of dielectric material 12 of the present invention. Electrical contacts 14 and 16 are provided on opposite sides of the dielectric layer 12.

Figure 2:
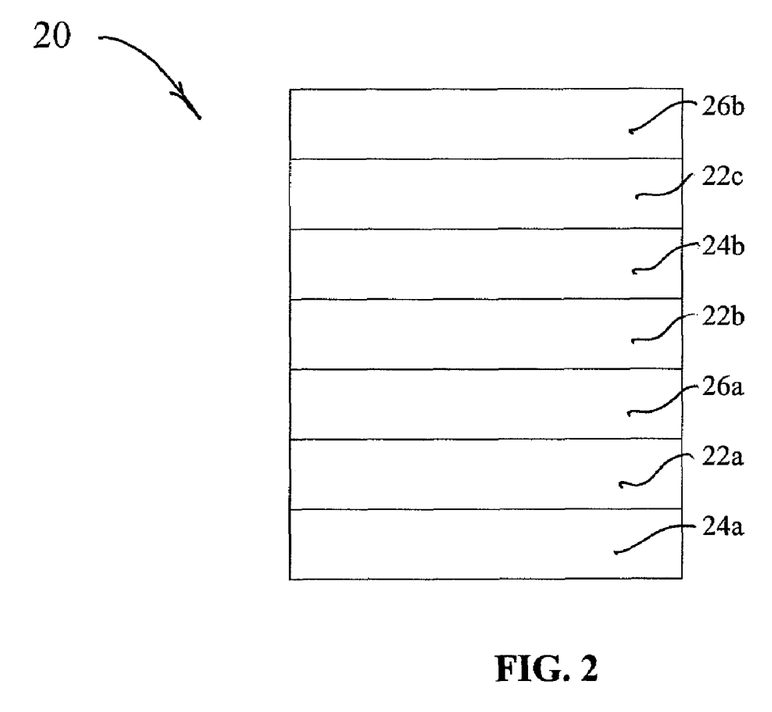
FIG. 2 is a partially schematic illustration of a multilayer capacitor which may include a dielectric material in accordance with another embodiment of the present invention.

FIG. 2 schematically illustrates a multilayer capacitor 20 including multiple layers of dielectric material 22a, 22b and 22c of the present invention. The dielectric layers 22a, 22b and 22c are sandwiched between electrical contact layers 24a, 26a, 24b and 26b.

The sodium bismuth titanate compositions of the present invention generally correspond to the formula $ABO_3$, where the A site includes Na and Bi, and the B site includes Ti. In accordance with the present invention, the Ti at the B site is partially substituted by monovalent and 5-valent elements. For example, the B site monovalent ions may be selected from Li, Na, K, Rb, Ag and Cu, and the B site 5-valent ions may be selected from Nb, Ta, P and Ti. In certain embodiments, the Na and/or Bi at the A site are partially substituted by other ions. For example, Na at the A site may be partially substituted by monovalent Li, Na, K, Rb, Ag and/or Cu ions, while Bi at the A site may be partially substituted by trivalent La, Y, Dy and/or Sm ions. Furthermore, pairs of Na and Bi ions at the A site may be partially substituted by divalent Ba, Ca, Mg, Pb and/or Sr ions. In one embodiment, the Ti at the B site is further partially substituted by tetravalent Hf, Zr and/or Sn ions. In addition, the Ti at the B site may be further partially substituted by 6-valent W ions.

In accordance with embodiments of the present invention, starting compositions within the substituted NBT system were selected based on phase transition temperatures where permittivity maxima are typically located. To maximize the temperature range over which there was a plateau of elevated dielectric constant, compositions were developed with one or more very high temperature phase transition and one or more very low temperature phase transition. The temperature and diffuseness of each phase transition (hence breadth of the high permittivity plateau between transition points) was then adjusted with additives targeted at specific sites in the lattice (note that in unmodified NBT, with generic formula $ABO_3$, there is split Na+/Bi3+ occupancy on the A-site, and the B-site is occupied by Ti). Finally, the dielectric response of the material was flattened across the band of interest with secondary dopants.

Primary stoichiometric additions were made of various elements to replace ions on the A-site of the NBT lattice (normally occupied jointly by sodium and bismuth as $Na_{0.5}Bi_{0.5}$). These included lead, strontium, calcium, barium and magnesium. Investigations began with atomic percentages of each substituent calculated to retain the same baseline crystal structure as the unmodified BNT. Variations around this amount were then explored to optimize dielectric performance. In appropriate quantities, these substituents (particularly those with large polarizable cations) were found to significantly decrease the temperature of the first phase transition and thus broaden the total temperature range over which permittivity is elevated. Undoped NBT undergoes its first transition from a rhombohedral relaxor ferroelectric phase (FE) at room temperature and below to a rhombohedral antiferroelectric phase (AF) above 220° C. The second transition is then from the antiferroelectric phase to a paraelectric phase (PE) at 320° C., followed by a third transition to a cubic phase above 520° C. An aspect of the present invention is the extension of the temperature range over which the antiferroelectric phase is stable. The dielectric constant is not voltage dependent in this phase, conferring extraordinary voltage stability on the material.

Examples of secondary additives include relatively low levels of ions capable of trapping electrons by adjusting valence, e.g., Mn, Cu, Co, Ni, Zn, Cr and Nd. These act as resistivity enhancers and hence service life extenders. K can be added to lower the FE-AF transition and act as a sintering aid, and La may be used to level out the dielectric response across a wide range of temperatures.

Another class of useful additives is ferroic materials with transition temperatures well away from those of the substituted NBT. These can again smear the high dielectric constant region over a wider temperature range when processed together with the substituted NBT as either a solid solution or as a deliberately tailored inhomogeneity between grain and grain boundary phases. The latter is typically produced by liquid phase sintering. Suitable examples of the former solid solution type constituents include $NaNbO_3$ (maximum permittivity 2100 at $-200°$ C.) and $Pb(Ni_{0.33}Nb_{0.67})O_3$ (maximum permittivity 4000 at $-120°$ C.) and $Pb(Mg_{0.33}Ta_{0.67})O_3$ (maximum permittivity 7000 at $-98°$ C.) each of which may extend high permittivity performance down to extremely low temperatures.

In accordance with embodiments of the present invention, the NBT is formulated with BT, CT, MT, PT and/or ST, combined with ions selected from groups IA, IB, IIB, IIIA, IIIB, IVA, IVB, VA, VB, VIB, VIIB and/or VIIIB of the periodic table. The formulations may be made in either in an isovalent manner or an aliovalent manner requiring compensation by either A-site (Na—Bi) or oxygen vacancies in the crystal structure. Typically, these off-stoichiometry, or aliovalent, additions are limited to 1 to 2 wt % of the total composition. The ranges and combinations of the substituents may be selected depending on the temperature range to be addressed.

Capacitors are classified according to their operating temperature range and tolerance over that range. Thus, one of the most common type of capacitor in use today is classified X7R, where "X" signifies the low end of the range ($-55°$ C.), "7" the upper end of the range ($125°$ C.), and "R" the tolerance over the range ($\pm15\%$ compared to the room temperature value). Improving the upper end of this range is an objective of this invention. For example, in an isovalent embodiment of the invention, dielectrics are formulated to extend the X7R range to $200°$ C. and above based on NBT with the general formula:

where $Me^1$ is a monovalent metal ion selected from Li, Na, K, Rb, Ag and Cu or combinations thereof, $Me^2$ is a divalent metal ion selected from Ba, Ca, Mg, Pb and/or Sr or combinations thereof, $Me^3$ is a trivalent metal ion selected from La and its series in the Periodic Table, Y, Dy, Sm or combinations thereof, $Me^4$ is a tetravalent metal ion selected from Hf; Zr, and Sn or combinations thereof, $Me^5$ is a 5-valent ion selected from Nb, Ta, P, Sb or combinations thereof, and $Me^6$ is a 6-valent ion such as W.

In one embodiment, $Me^1$ is Na, $Me^2$ is Ba and $Me^5$ is Ta, and $x<0.10$, $0.02<s<0.10$, $t<0.01$, $z<0.01$, $0.15<w<0.35$ and $y<0.01$. Such dielectrics have been prepared with dielectric constant $>1200$ and $<+15\%$ variation from $-30$ to $>200°$ C. and loss $(\tan\delta)<2\%$ at room temperature. Since Ta based starting materials are relatively expensive, different strategies can be employed to minimize utilization of sodium tantalate (NTa) while still maintaining high permittivities ($>1100$) from $-55$ to $>200°$ C. For example, it is possible to mix precalcined ST (or BT) substituted NBT (or NBT-NTa) with preformed materials having very low Curie temperatures such as $Pb(Ni_{0.33}Nb_{0.67})O_3$ (maximum permittivity 4000 at $-120°$ C.) and then recalcine to develop properties representative of the solid solution of the preformed constituents.

In another embodiment, trace amounts of ions capable of multiple valence states, e.g., Mn, Cu, Co, Ni, Zn, Cr, Nd, etc., are added to increase resistivity. In a preferred embodiment Mn is added at levels 0.01-0.2 wt % Mn.

In another embodiment of this invention, monolithic or multilayer capacitors can be fabricated from this dielectric to extend the upper end of the X7R range to $>200°$ C.

In some applications, capacitors having near zero variation in capacitance with temperature are desirable. These so-called NPO types are typically fabricated from dielectrics having dielectric constants<200. An embodiment of this invention provides dielectrics based on NBT with the same general formula as above having NPO characteristics to temperatures>$200°$ C. and dielectric constants>500. In one embodiment of this type, $Me^1$ is Na and $Me^5$ is Nb, and $x<0.01$, $s<0.01$, $t<0.01$, $z<0.01$, $0.15<w<0.60$ and $y<0.01$. In another embodiment where $0.25<w<0.35$, dielectrics have been prepared with dielectric constant>500 and near-zero variation from $-80$ to $200°$ C.

In other applications, compact capacitors having a broad range of elevated operating temperatures are desirable. An embodiment of this invention provides dielectrics based on NBT with the same general formula as above having dielectric constants>2500 over a wide range of elevated temperatures>$100°$ C. In one embodiment of this type, $Me^1$ is K and $Me^5$ is Ta, and $x<0.01$, $s<0.01$, $t<0.01$, $z<0.01$, $0.08<w<0.12$ and $y<0.01$. Dielectrics have been prepared from this formulation with dielectric constant ~3000 and $<\pm10\%$ variation from 80 to $300°$ C.

The following examples are intended to illustrate various aspects of the present invention, and are not intended to limit the scope of the invention.

EXAMPLE 1

A dielectric having the composition $Na_{0.2}(Na_{0.5}Bi_{0.5})_{0.75}Ba_{0.05}Ti_{0.8}Ta_{0.2}O_3$ (0.75NBT-0.05BT-0.2NTa) was prepared from reagent-grade oxide and carbonate powders. The powders were weighed according to their respective stoichiometric proportion and mixed on a ball mill with zirconia media in isopropyl alcohol for a period of 12-24 hours. The dried mixture was calcined at $750°$ C. for 2 hours. After calcination, binder was added at a level of 1% by weight and mixed for 6-8 hours with zircona media on a ball mill. The powder-binder mixture was dried, ground, and passed through a 100 mesh sieve to ensure uniform distribution of the binder.

Pellets consisting of 2-3 grams of powder were pressed using a laboratory Carver press and a ⅝" die. The pellets were fired on zirconia setters with zirconia sand under them to prevent the pellets from adhering to the surface of the setter. They were fired at $1200°$ C. for 2 hours and the densities were above 90% theoretical. The fired pellets that were used for dielectric measurements were electroded with paint-on silver paste at $550°$ C. for 12 min. After firing the electrode, the surface was polished with a pencil eraser to remove the oxidation that forms during the firing cycle. The pellets that were used for x-ray diffraction measurements were wet ground in an alumina mortar and pestle with isopropyl alcohol. Other pellets were retained to perform density measurements and SEM microstructure.

Dielectric measurements were performed at high temperature on a Hewlett Packard 4192A LF Impedance analyzer. The HP 4192A was connected to a Thermolyne 2100 tube furnace and a computer running a Lab View program. The relative permittivity was measured on heating from room temperature to $450°$ C., at decade frequencies ranging from 100 Hz to 1 MHz. Low temperature relative permittivity measurements were performed on a Hewlett Packard 4284A precision LCR meter in a front loading Delta 9039 box chamber connected to a liquid nitrogen tank. The measurements were taken on cooling from 200° C. to −75° C. and subsequently combined in the plotting software with the high temperature measurements.

X-ray diffraction measurements were performed on a Phillips d 500 instrument with a 40 sample changer. The powders were loaded into a holder that rotates to help reduce preferred orientation. 2θ ranged from 15° to 100°, the step size was 0.02° and the dwell time at each step was 10 seconds. These parameters were chosen to yield very accurate results with low background for use in Rietveld refinements.

Figure 3:
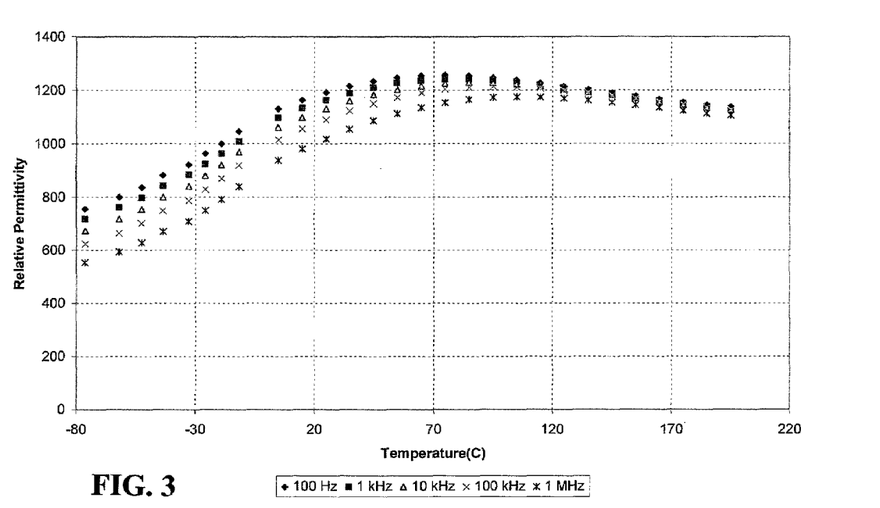
FIG. 3 is a graph of relative permittivity versus temperature for a dielectric material of the present invention at different frequencies.
Figure 4:
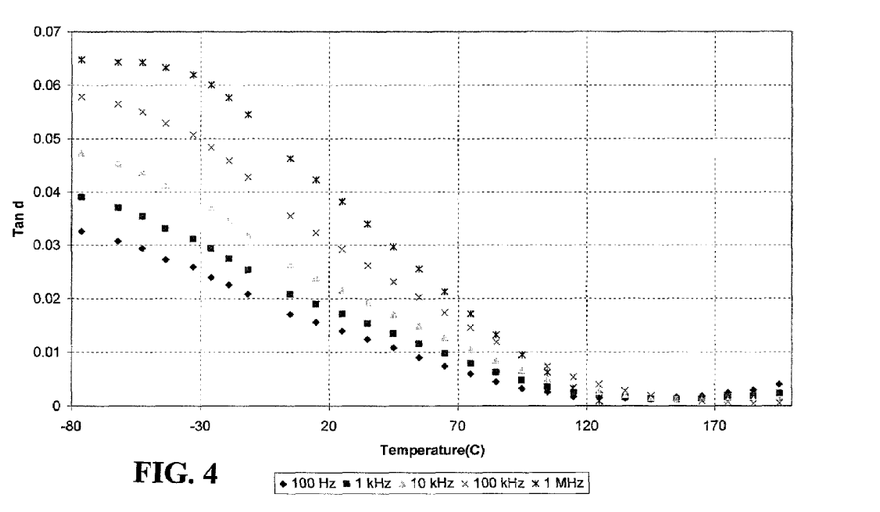
FIG. 4 is a graph of loss tangent versus temperature for a dielectric material of the present invention at different frequencies.

FIG. 3 and FIG. 4 show relative permittivity and loss (tanδ) values as a function of temperature from −80 to 200° C. It is seen that the dielectric has a relative permittivity in excess of 1100 at room temperature and varies <±15% from −20 to 200° C. Tanδ values at 1 kHz are <4% across the entire temperature range and <2% from 20 to 200° C.

EXAMPLE 2

Dielectrics having the composition 0.75NBT-5BT-20NTa were prepared with varying amounts of added $Mn_3O_4$ using the method described in Example 1. Resistivities were measured on the sintered discs at 200° C. with applied voltages 1-2 kV. The sample thicknesses ranged from 1-2 mm.

Figure 5:
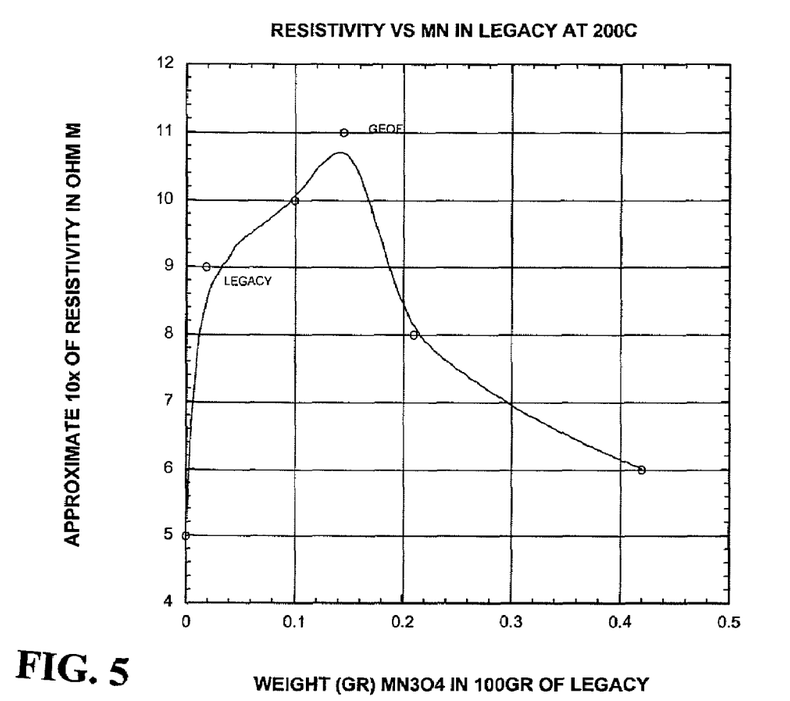
FIG. 5 is a graph showing variation in resistivity of a dielectric material doped with differing amounts of manganese oxide in accordance with embodiments of the present invention.

Resistivities are plotted in FIG. 5 as a function of wt % $Mn_3O_4$. It is seen that resistivities in excess of $10^{10}$ ohm-m can be obtained at 200° C. for a range 0.10-0.16 wt % $Mn_3O_4$ (0.07-0.12 wt % Mn).

EXAMPLE 3

Figure 6:
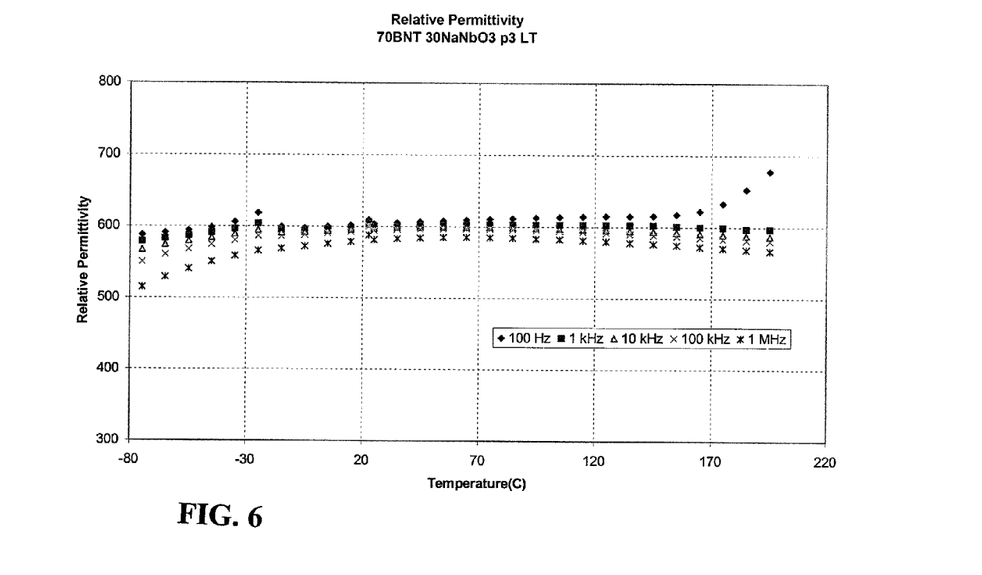
FIG. 6 is a graph of relative permittivity versus temperature for a dielectric material of the present invention at different temperatures.
Figure 7:
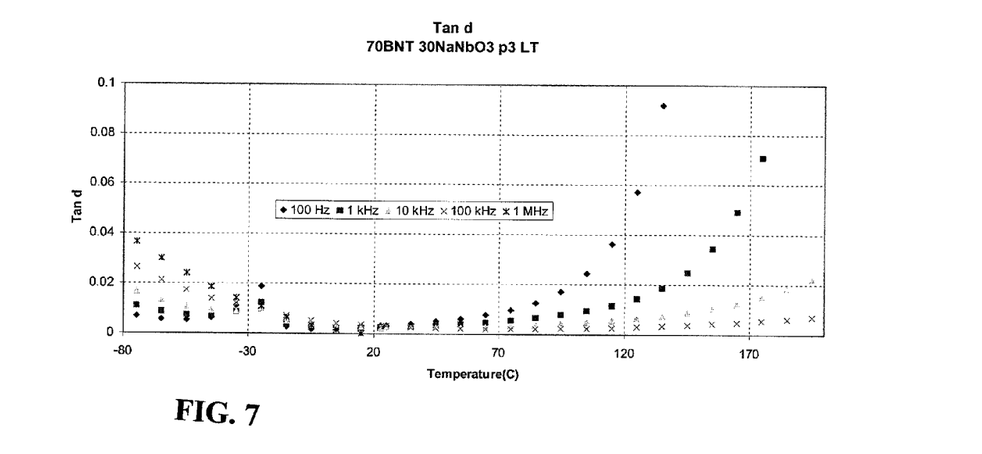
FIG. 7 is a graph of loss tangent versus temperature for a dielectric material of the present invention at different temperatures.

Dielectrics having the composition $Na_{0.3}(Na_{0.5}Bi_{0.5})_{0.7}Ti_{0.7}Nb_{0.3}O_3$ (70NBT-30NNb) were prepared using the method described in Example 1. Relative permittivity was measured as a function of temperature from −80 to 200° C. It is seen in FIG. 6 that the dielectric has a relative permittivity >500 at room temperature with near zero variation from −80 to 200° C. FIG. 7 illustrates loss (tanδ) properties as a function of temperature.

EXAMPLE 4

Figure 8:
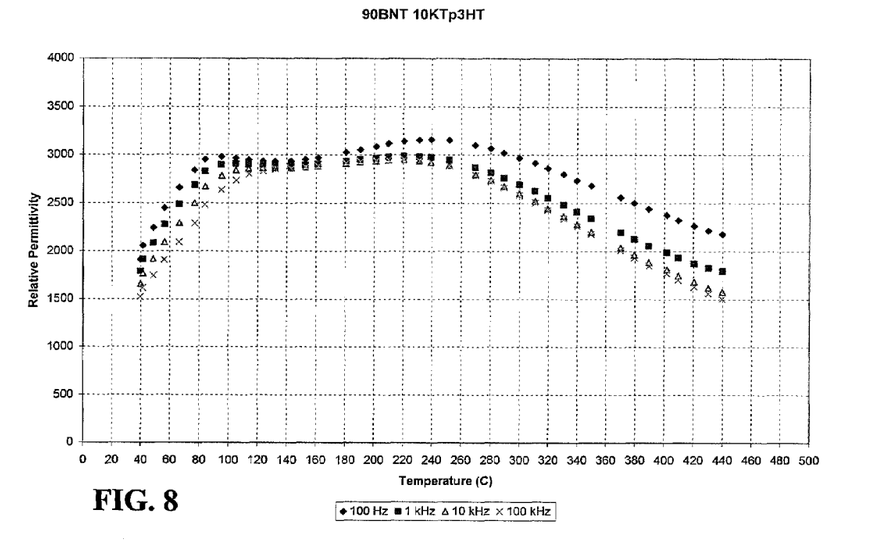
FIG. 8 is a graph of relative permittivity versus temperature for a dielectric material of the present invention at different temperatures.
Figure 9:
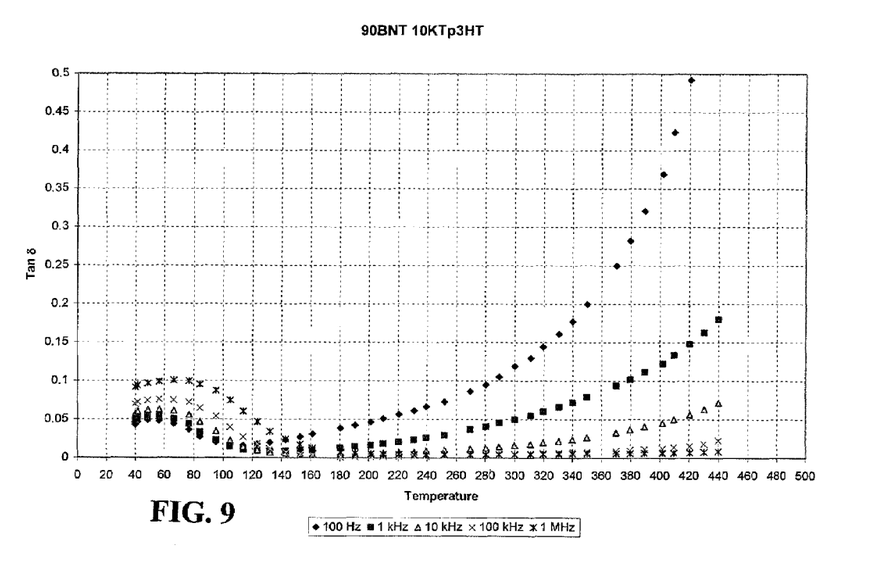
FIG. 9 is a graph of loss tangent versus temperature for a dielectric material of the present invention at different temperatures.

Dielectrics having the composition $K_{0.1}(Na_{0.5}Bi_{0.5})_{0.9}Ti_{0.9}Ta_{0.1}O_3$ (90NBT-10KTa) were prepared using the method described in Example 1. Relative permittivity was measured as a function of temperature from 40 to 440° C. It is seen in FIG. 8 that the dielectric has a relative permittivity >2500 at 80° C. with <±15% variation from 80 to 340° C. FIG. 9 shows that tanδ values are <5% from 80 to 300° C.

EXAMPLE 5

Figure 10:
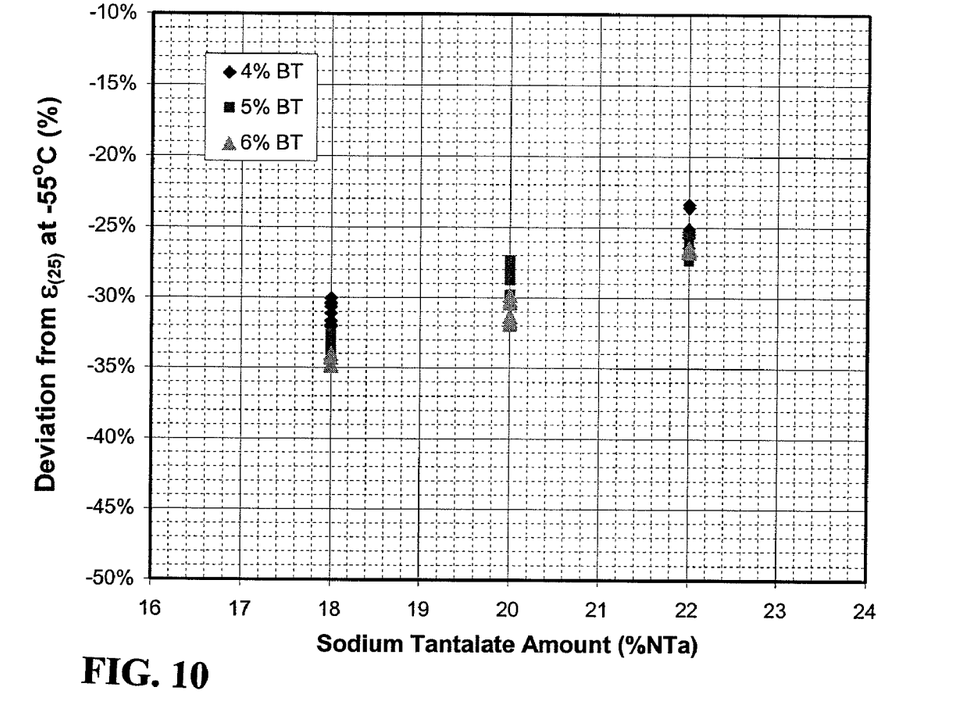
FIG. 10 is a graph illustrating drops in permittivity for various dielectric compositions as the temperature is reduced from 25° C. to −55° C. for NBT compositions having varying amounts of barium titanate and sodium tantalate additions.

Dielectrics having the composition $Na_{0.2}(Na_{0.5}Bi_{0.5})_{0.75}Ba_{0.05}Ti_{0.8}Ta_{0.2}O_3$ (0.75NBT-0.05BT-0.2NTa) were prepared using the method described in Example 1, except the amounts of substituted Ta (as NTa) and Ba (as BT) were varied slightly. Relative permittivity was measured as a function of temperature from −80 to 200° C., with a focus on achieving <15% drop in permittivity from 25° C. to −55° C. FIG. 10 shows the % drop in permittivity vs NTa content. Extrapolating the trend predicts that <15% drop in permittivity from 25° C. to −55° C. could be achieved with 28-30% NTa and that the >1100 permittivity at 25° C. could be maintained by increasing BT, e.g., 6-8%.

While this example demonstrates how the low temperature end of the ±15% range can be extended to (and possibly beyond)-55° C. starting from the BT substituted material, we note that similar strategies could be applied to the ST-NBT family where less NTa might be required. This could be significant, since the tantalum oxide used is a relatively expensive starting material.

EXAMPLE 6

Dielectrics having the composition $Na_{0.2}(Na_{0.5}Bi_{0.5})_{0.75}Ba_{0.05}Ti_{0.8}Ta_{0.2}O_3$ (0.75NBT-0.05BT-0.2NTa) are prepared using the method described in Example 1, except the dispersing medium is water. This process variation is critical to inexpensive scale up of the material preparation, however care must be taken due to the solubility of the sodium carbonate starting material in water. Tests have shown that it completely dissolves and reactions occur during the milling stage which affects the reactivity of the raw mix during calcinations. This solubility problem is mitigated through proper pH control by adding oxalic acid prior to milling. The desired pH range is 7-10 under which conditions sodium oxalate and bicarbonate form as precipitates. The procedure then continues as in Example 1, except the milling jars are equipped with pressure vents.

While this example cites pH control to mitigate the solubility of sodium carbonate in water, alternative processes are feasible such as premilling the other raw materials and adding the sodium carbonate in solution, followed by rapid drying, gelation or pelletizing to form the dried raw material to be calcined. If these steps are taken then the material fabrication can be scaled up in water to large industrial quantities.

Whereas particular embodiments of this invention have been described above for purposes of illustration, it will be evident to those skilled in the art that numerous variations of the details of the present invention may be made without departing from the invention.

The invention claimed is:

1. A dielectric material for use in a capacitor comprising sodium bismuth titantate in which titanium is partially substituted by 5-valent ions and sodium and/or bismuth is substituted by monovalent ions, wherein the material corresponds to the formula:

where $Me^1$ is a monovalent metal ion selected from Li, Na, K, Rb, Ag and Cu or combinations thereof, $Me^2$ is a divalent metal ion selected from Ba, Ca, Mg, Pb and/or Sr or combinations thereof, $Me^3$ is a trivalent metal ion selected from La and its series in the periodic table, Y, Dy, Sm, or combinations thereof, $Me^4$ is a tetravalent metal ion selected from Hf, Zr and Sn or combinations thereof, $Me^5$ is a 5-valent ion selected from Nb, Ta, P, Sb or combinations thereof, and $Me^6$ is a 6-valent ion including W and wherein x<0.01, 0.05<s<0.6, t<0.01, z<0.01, 0<w<0.2 and y<0.01.

2. The dielectric material of claim 1, wherein the monovalent ions comprise K.

3. The dielectric material of claim 1, wherein the monovalent ions comprise Na.

4. The dielectric material of claim 1, wherein the 5-valent ions comprise Ta.

5. The dielectric material of claim 1, wherein the sodium is partially substituted by monovalent ions.

6. The dielectric material of claim 5, wherein the monovalent ions comprise K.

7. The dielectric material of claim 5, wherein the monovalent ions comprise Rb.

8. The dielectric material of claim 1, wherein the bismuth is partially substituted by trivalent ions.

9. The dielectric material of claim 1, wherein the sodium and bismuth are partially substituted by divalent ions.

10. The dielectric material of claim 1, wherein the titanium is further partially substituted by tetravalent ions.

11. The dielectric material of claim 1, wherein the titanium is further substituted by 6-valent ions.

12. The dielectric material of claim 1, further comprising a resistivity enhancing additive comprising an oxide of one or more metals capable of multiple valence states selected from Mn, Cu, Co, Ni, Zn, Cr and/or Nd added in an amount of 0.01-0.20 wt % of the material.

13. The dielectric material of claim 1, wherein $Me^2$ is Sr and $0.08 < s < 0.52$.

14. The dielectric material of claim 1, wherein $Me^2$ is Sr and $0.10 < s < 0.35$.

15. The dielectric material of claim 1, wherein $Me^2$ is Ca and $0.10 < s < 0.25$.

16. The dielectric material of claim 1, wherein $Me^2$ is a combination of Ca and Ba, $0.05 < Ca < 0.20$ and $0.04 < Ba < 0.20$.

17. The dielectric material of claim 1, wherein $Me^2$ is a combination of Ca and Ba, $0.08 < Ca < 0.12$ and $0.10 < Ba < 0.20$.

18. The dielectric material of claim 1, wherein $Me^2$ is a combination of Sr and Ba, $0.25 < Sr < 0.35$ and $0.25 < Ba < 0.35$.

19. The dielectric material of claim 1, wherein the following properties are obtained across a 200° C. temperature range within the band 50-500° C.: loss is less than 5%, the strain is less than 100 microstrains at an applied field of 2 MV/m, the voltage coefficient is less than ±20% from 0-10 MV/m, the temperature coefficient is less than ±25% from its value at the center of the temperature range, the resistivity is greater than $10^9$ ohm-m and the dielectric constant is greater than 1500.

20. The dielectric material of claim 1, wherein the following properties are obtained across a 200° C. temperature range within the band 50-500°C.: loss is less than 3%, the strain is less than 30 microstrains at an applied field of 2 MV/m, the voltage coefficient is less than ±10% from 0-10 MV/m, the temperature coefficient is less than ±15% from its value at the center of the temperature range, the resistivity is greater than $10^{10}$ ohm-m and the dielectric constant is greater than 2500.

21. A dielectric material for use in a capacitor comprising sodium bismuth titantate in which titanium is partially substituted by 5-valent ions and sodium and/or bismuth is substituted by monovalent ions, wherein the material corresponds to the formula:

$\{[(Na_{0.5-x}+Me^1_x)(Bi_{0.5-t}+Me^3_t)]_{1-s}+Me^2_s\}_{1-w}\{Ti_{1-z}+Me^4_z\}_{1-w}O_{3-3w}+\{Me^1_{w-y}+Me^5_{w-y}+Me^6_y\}O_{3w}$ where $Me^1$ is a monovalent metal ion selected from Li, Na, K, Rb, Ag and Cu or combinations thereof, $Me^2$ is a divalent metal ion selected from Ba, Ca, Mg, Pb and/or Sr or combinations thereof, $Me^3$ is a trivalent metal ion selected from La and its series in the periodic table, Y, Dy, Sm, or combinations thereof, $Me^4$ is a tetravalent metal ion selected from Hf, Zr, and Sn or combinations thereof, $Me^5$ is a 5-valent ion selected from Nb, Ta, P, Sb or combinations thereof, and $Me^6$ is a 6-valent ion including W and wherein $0.10 < x < 0.30$, $s < 0.01$, $t < 0.01$, $z < 0.01$, $0 < w < 0.2$ and $y < 0.01$.

22. The dielectric material of claim 21, further comprising a resistivity enhancing additive comprising an oxide of one or more metals capable of multiple valence states selected from Mn, Cu, Co, Ni, Zn, Cr and/or Nd added in an amount of 0.01-0.20 wt % of the material.

23. The dielectric material of claim 21, wherein $Me^1$ is K and $0.15 < x < 0.25$.

24. A dielectric material for use in a capacitor comprising sodium bismuth titantate in which titanium is partially substituted by 5-valent ions and sodium and/or bismuth is substituted by monovalent ions, wherein the material corresponds to the formula:

$\{[(Na_{0.5-x}+Me^1_x)(Bi_{0.5-t}+Me^3_t)]_{1-s}+Me^2_s\}_{1-w}\{Ti_{1-z}+Me^4_z\}_{1-w}O_{3-3w}+\{Me^1_{w-y}+Me^5_{w-y}+Me^6_y\}O_{3w}$ where $Me^1$ is a monovalent metal ion selected from Li, Na, K, Rb, Ag and Cu or combinations thereof, $Me^2$ is a divalent metal ion selected from Ba, Ca, Mg, Pb and/or Sr or combinations thereof, $Me^3$ is a trivalent metal ion selected from La and its series in the periodic table, Y, Dy, Sm, or combinations thereof, $Me^4$ is a tetravalent metal ion selected from Hf, Zr, and Sn or combinations thereof, $Me^5$ is a 5-valent ion selected from Nb, Ta, P, Sb or combinations thereof, and $Me^6$ is a 6-valent ion including W and wherein $x < 0.01$, $0.02 < s < 0.20$, $0.005 < t < 0.12$, $z < 0.01$, $0 < w < 0.20$ and $y < 0.01$.

25. The dielectric material of claim 24, further comprising a resistivity enhancing additive comprising an oxide of one or more metals capable of multiple valence states selected from Mn, Cu, Co, Ni, Zn, Cr and/or Nd added in an amount of 0.01-0.20 wt % of the material.

26. The dielectric material of claim 24, wherein $Me^2$ is Pb and $Me^3$ is La.

27. The dielectric material of claim 24, wherein $0.08 < s < 0.14$ and $0.01 < t < 0.06$.

28. The dielectric material of claim 24, wherein $Me^2$ is Ba and $Me^3$ is La.

29. The dielectric material of claim 24, wherein $0.03 < s < 0.09$ and $0.005 < t < 0.03$.

30. The dielectric material of claim 24, wherein the following properties are obtained across a 200° C. temperature range within the band 50-500° C.: loss is less than 5%, the strain coefficient is less than 100 microstrains at an applied field of 2 MV/m, the voltage coefficient is less than ±20% from 0-10 MV/m, the temperature coefficient is less than ±25% from its value at the center of the temperature range, the resistivity is greater than $10^9$ ohm-m and the dielectric constant is greater than 1500.

31. The dielectric material of claim 24, wherein the following properties are obtained across a 200° C. temperature range within the band 50-500° C.: loss is less than 3%, the strain coefficient is less than 30 microstrains at an applied field of 2 MV/m, the voltage coefficient is less than ±10% from 0-10 MV/m, the temperature coefficient is less than ±15% from its value at the center of the temperature range, the resistivity is greater than $10^{10}$ ohm-m and the dielectric constant is greater than 2500.

32. A dielectric material for use in a capacitor comprising sodium bismuth titantate in which titanium is partially substituted by 5-valent ions and sodium and/or bismuth is substituted by monovalent ions, wherein the material corresponds to the formula:

$\{[(Na_{0.5-x}+Me^1_x)(Bi_{0.5-t}+Me^3_t)]_{1-s}+Me^2_s\}_{1-w}\{Ti_{1-z}+Me^4_z\}_{1-w}O_{3-3w}+\{Me^1_{w-y}+Me^5_{w-y}+Me^6_y\}O_{3w}$ where Me1 is a monovalent metal ion selected from Li, Na, K, Rb, Ag and Cu or combinations thereof, Me2 is a divalent metal ion selected from Ba, Ca, Mg, Pb and/or Sr or combinations thereof, Me3 is a trivalent metal ion selected from La and its series in the periodic table, Y, Dy, Sm, or combinations thereof, Me4 is a tetravalent metal ion selected from Hf, Zr, and Sn or combinations thereof, Me5 is a 5-valent ion selected from Nb, Ta, P, Sb or combinations thereof, and Me6 is a 6-valent ion including W and wherein $x<0.01$, $0.03<s<0.60$, $t<0.01$, $0.01<z<0.25$, $0<w<0.2$ and $y<0.01$.

33. The dielectric material of claim 32, further comprising a resistivity enhancing additive comprising an oxide of one or more metals capable of multiple valence states selected from Mn, Cu, Co, Ni, Zn, Cr and/or Nd added in an amount of 0.01-0.20 wt % of the material.

34. The dielectric material of claim 32, wherein $Me^2$ is Sr and $Me^4$ is Zr.

35. The dielectric material of claim 32, wherein $0.22<s<0.28$ and $0.01<z<0.06$.

36. The dielectric material of claim 32, wherein $Me^2$ is Ba and $Me^4$ is Zr.

37. The dielectric material of claim 32, wherein $0.03<s<0.17$ and $0.01<z<0.06$.

38. The dielectric material of claim 32, wherein $Me^2$ is a combination of Ba and Sr and $Me^4$ is Sn.

39. The dielectric material of claim 38, wherein $0.10<Ba<0.30$, $0.10<Sr<0.30$ and $0.10<Sn<0.25$.

40. The dielectric material of claim 32, wherein the following properties are obtained across a 200° C. temperature range within the band 50-500° C.: loss is less than 5%, the strain coefficient is less than 100 microstrains at an applied field of 2 MV/m, the voltage coefficient is less than ±20% from 0-10 MV/m, the temperature coefficient is less than ±25% from its value at the center of the temperature range, the resistivity is greater than $10^9$ ohm-m and the dielectric constant is greater than 1500.

41. The dielectric material of claim 32, wherein the following properties are obtained across a 200° C. temperature range within the band 50-500° C.: loss is less than 3%, the strain coefficient is less than 30 microstrains at an applied field of 2 MV/m, the voltage coefficient is less than ±10% from 0-10 MV/m, the temperature coefficient is less than ±15% from its value at the center of the temperature range, the resistivity is greater than $10^{10}$ ohm-m and the dielectric constant is greater than 2500.

42. A dielectric material for use in a capacitor comprising sodium bismuth titantate in which titanium is partially substituted by 5-valent ions and sodium and/or bismuth is substituted by monovalent ions, wherein the material corresponds to the formula:

where $Me^1$ is a monovalent metal ion selected from Li, Na, K, Rb, Ag and Cu or combinations thereof, $Me^2$ is a divalent metal ion selected from Ba, Ca, Mg, Pb and/or Sr or combinations thereof, $Me^3$ is a trivalent metal ion selected from La and its series in the periodic table, Y, Dy, Sm, or combinations thereof, $Me^4$ is a tetravalent metal ion selected from Hf, Zr, and Sn or combinations thereof, $Me^5$ is a 5-valent ion selected from Nb, Ta, P, Sb or combinations thereof, and $Me^6$ is a 6-valent ion including W and wherein $x<0.30$, $s<0.01$, $t<0.01$, $z<0.01$, $0<w<0.20$ and $y<0.01$.

43. The dielectric material of claim 42, further comprising a resistivity enhancing additive comprising an oxide of one or more metals capable of multiple valence state selected from Mn, Cu, Co, Ni, Zn, Cr and/or Nd added in the amount of 0.01-0.20 wt % of the material.

44. The dielectric material of claim 42, wherein $Me^1$ is K and $Me^5$ is Ta.

45. The dielectric material of claim 42, wherein $0.05<x<0.15$ and $0.05<w<0.15$.

46. The dielectric material of claim 42, wherein the following properties are obtained across a 200° C. temperature range within the band 50-500° C.: loss is less than 5%, the strain coefficient is less than 100 microstrains at an applied field of 2 MV/m, the voltage coefficient is less than ±20% from 0-10 MV/m, the temperature coefficient is less than ±25% from its value at the center of the temperature range, the resistivity is greater than $10^9$ ohm-m and the dielectric constant is greater than 1500.

47. The dielectric material of claim 42, wherein the following properties are obtained across a 200° C. temperature range within the band 50-500° C.: loss is less than 3%, the strain coefficient is less than 30 microstrains at an applied field of 2 MV/m, the voltage coefficient is less than ±10% from 0-10 MV/m, the temperature coefficient is less than ±15% from its value at the center of the temperature range, the resistivity is greater than $10^{10}$ ohm-m and the dielectric constant is greater than 2500.

48. A dielectric material for use in a capacitor comprising sodium bismuth titantate in which titanium is partially substituted by 5-valent ions and sodium and/or bismuth is substituted by monovalent ions, wherein the material corresponds to the formula:

where $Me^1$ is a monovalent metal ion selected from Li, Na, K, Rb, Ag and Cu or combinations thereof, $Me^2$ is a divalent metal ion selected from Ba, Ca, Mg, Pb and/or Sr or combinations thereof, $Me^3$ is a trivalent metal ion selected from La and its series in the periodic table, Y, Dy, Sm, or combinations thereof, $Me^4$ is a tetravalent metal ion selected from Hf, Zr, and Sn or combinations thereof, $Me^5$ is a 5-valent ion selected from Nb, Ta, P, Sb or combinations thereof, and $Me^6$ is a 6-valent ion including W and wherein $x<0.30$, $0.02<s<0.10$, $t<0.01$, $z<0.01$, $0.05<w<0.30$ and $y<0.01$.

49. The dielectric material of claim 48, further comprising a resistivity enhancing additive comprising an oxide of one or more metals capable of multiple valence states selected from Mn, Cu, Co, Ni, Zn, Cr and/or Nd added in the amount of 0.01-0.20 wt % of the material.

50. The dielectric material of claim 48, wherein $Me^2$ is Ba and $Me^5$ is Ta.

51. The dielectric material of claim 48, wherein x is 0, $0.03<s<0.07$ and $0.15<w<0.30$.

52. The dielectric material of claim 48, wherein $Me^1$ is K, $Me^2$ is Ba and $Me^5$ is Ta.

53. The dielectric material of claim 48, wherein $0.03<x<0.20$, $0.03<s<0.07$ and $0.03<w<0.20$.

54. The dielectric material of claim 48, wherein the loss is less than 5% from −30 to 200° C., the strain is less than 100 microstrains at an applied field of 2 MV/m, the voltage coefficient is less than ±20% from 0-10 MV/m, the temperature coefficient is less than ±25% from its ambient value between −30 and 200° C., the resistivity is greater than $10^{10}$ ohm-m from −30 to 200° C. and the ambient dielectric constant is greater than 1000.

55. The dielectric material of claim 48, wherein the loss is less than 3% from −30 to 200° C., the strain is less than 30 microstrains at an applied field of 2 MV/m, the voltage coefficient is less than ±20% from 0-10 MV/m, the temperature coefficient is less than ±15% from its ambient value between −30 and 200° C., the resistivity is greater than $10^{11}$ ohm-m from −30 to 200° C. and the ambient dielectric constant is greater than 1100.

56. A dielectric material for use in a capacitor comprising sodium bismuth titantate in which titanium is partially substituted by 5-valent ions and sodium and/or bismuth is substituted by monovalent ions, wherein the material corresponds to the formula:

where $Me^1$ is a monovalent metal ion selected from Li, Na, K, Rb, Ag and Cu or combinations thereof, $Me^2$ is a divalent metal ion selected from Ba, Ca, Mg, Pb and/or Sr or combinations thereof, $Me^3$ is a trivalent metal ion selected from La and its series in the periodic table, Y, Dy, Sm, or combinations thereof, $Me^4$ is a tetravalent metal ion selected from Hf, Zr, and Sn or combinations thereof, $Me^5$ is a 5-valent ion selected from Nb, Ta, P, Sb or combinations thereof, and $Me^6$ is a 6-valent ion including W and wherein $x<0.30$, $s<0.01$, $t<0.01$, $z<0.01$, $0.15<w<0.60$ and $y<0.01$.

57. The dielectric material of claim 56, further comprising a resistivity enhancing additive comprising an oxide of one or more metals capable of multiple valence states selected from Mn, Cu, Co, Ni, Zn, Cr and/or Nd added in the amount of 0.01-0.20 wt % of the material.

58. The dielectric material of claim 56, wherein $Me^1$ is Na and $Me^5$ is Nb.

59. The dielectric material of claim 56, wherein x is 0 and $0.20<w<0.50$.

60. The dielectric material of claim 56, wherein x is 0 and $0.25<w<0.35$.

61. The dielectric material of claim 56, wherein the loss is less than 5% from −55 to 200° C., the strain is less than 100 microstrains at an applied field of 2 MV/m, the voltage coefficient is less than ±10% from 0-10 MV/m, the temperature coefficient is less than 200 ppm/° C. from −55 to 200° C., the resistivity is greater than $10^{10}$ ohm-m from −55 to 200° C. and the dielectric constant is greater than 300 from −55 to 200° C.

62. The dielectric material of claim 56, wherein the loss is less than 2% from −55 to 200° C., the strain is less than 30 microstrains at an applied field of 2 MV/m, the voltage coefficient is less than ±5% from 0-10 MV/m, the temperature coefficient is less than 100 ppm/° C. from −55 to 200° C., the resistivity is greater than $10^{11}$ ohm-m from −55 to 200° C. and the dielectric constant is greater than 500 from −55 to 200° C.

63. A capacitor comprising a partially substituted sodium bismuth titanate dielectric material of general formula:

where $Me^1$ is a monovalent metal ion selected from Li, Na, K, Rb, Ag and Cu or combinations thereof, $Me^2$ is a divalent metal ion selected from Ba, Ca, Mg, Pb and/or Sr or combinations thereof, $Me^3$ is a trivalent metal ion selected from La and its series in the periodic table, Y, Dy, Sm or combinations thereof, $Me^4$ is a tetravalent metal ion selected from Hf, Zr, and Sn or combinations thereof, $Me^5$ is a 5-valent ion selected from Nb, Ta, P, Sb or combinations thereof, and $Me^6$ is a 6-valent ion including W; and a resistivity enhancing additive comprising an oxide of one or more metals capable of multiple valence states selected from Mn, Cu, Co, Ni, Zn, Cr and/or Nd added in an amount of 0.01-0.20 wt % of the material, wherein the following properties are obtained across a 200° C. temperature range within a band −55-400° C.: loss is less than 5%, strain is less than 100 microstrains at an applied field of 2 MV/m, voltage coefficient is less than ±20% from 0-10 MV/m, temperature coefficient is less than ±25% from its value at the center of the temperature range, resistivity is greater than $10^8$ ohm-m, and dielectric constant is greater than 500.

64. The capacitor of claim 63, wherein the following properties are obtained across a 300° C. temperature range within a band −55-350° C.: loss is less than 4%, strain is less than 50 microstrains at an applied field of 2 MV/m, voltage coefficient is less than ±20% from 0-10 MV/m, temperature coefficient is less than ±25% from its value at the center of the temperature range, resistivity is greater than $10^9$ ohm-m, and dielectric constant is greater than 1000.

* * * * *

UNITED STATES PATENT AND TRADEMARK OFFICE
CERTIFICATE OF CORRECTION

PATENT NO. : 7,697,263 B2
APPLICATION NO. : 11/691837
DATED : April 13, 2010
INVENTOR(S) : Bridger et al.

Page 1 of 1

It is certified that error appears in the above-identified patent and that said Letters Patent is hereby corrected as shown below:

In the Specification

Column 2, Line 65
"...Gd, Th,..." should read "...Gd, Tb,..."

Column 4, Line 23
"...further partially substituted by tetravalent Hf. Zr and/ or Sn..." should read
"...further partially substituted by tetravalent Hf, Zr and/ or Sn..."

Column 5, Line 50
"...is a tetravalent metal ion selected from Hf; Zr,..." should read
"...is a tetravalent metal ion selected from Hf, Zr,..."

In the Claims

Column 10, Line 20 claim 24
"...Me$^{5\ is\ a}$..." should read "...Me$^5$ is a..."

Signed and Sealed this
Thirtieth Day of September, 2014

Michelle K. Lee
*Deputy Director of the United States Patent and Trademark Office*